United States Patent
Roedseth et al.

(10) Patent No.: US 6,676,788 B1
(45) Date of Patent: Jan. 13, 2004

(54) TIRE BUILDING BLADDER

(75) Inventors: John Kolbjoern Roedseth, Bissen (LU); Emile Reding, Kehmen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/936,864

(22) PCT Filed: Apr. 30, 1999

(86) PCT No.: PCT/US99/09527
§ 371 (c)(1), (2), (4) Date: Sep. 11, 2001

(87) PCT Pub. No.: WO00/66349
PCT Pub. Date: Nov. 9, 2000

(51) Int. Cl.[7] .............................................. B29D 30/26
(52) U.S. Cl. ...................... 156/123; 156/132; 156/401; 156/293
(58) Field of Search ................................ 156/401, 132, 156/116, 123, 118, 416, 293; 425/51–53; 264/315; 152/524, 525, 511

(56) References Cited

U.S. PATENT DOCUMENTS

| | | | | |
|---|---|---|---|---|
| 3,218,208 A | * | 11/1965 | Molen | 156/116 |
| 3,932,255 A | * | 1/1976 | Saracsan | 156/401 |
| 4,182,393 A | * | 1/1980 | Larson et al. | 156/116 |
| 4,311,181 A | * | 1/1982 | Hausch | 152/525 |
| 4,936,365 A | * | 6/1990 | Chrobak et al. | 152/523 |
| 5,468,328 A | | 11/1995 | Kim et al. | 156/401 |
| 5,653,263 A | | 8/1997 | Killing | 138/30 |

FOREIGN PATENT DOCUMENTS

| | | | |
|---|---|---|---|
| EP | 0760275 | | 3/1997 |
| EP | 0862987 | | 9/1998 |
| FR | 2210508 | | 7/1974 |
| JP | 59-75808 A | * | 4/1984 ................. 152/524 |

* cited by examiner

Primary Examiner—Geoffrey L. Knable
(74) Attorney, Agent, or Firm—Nancy T. Krawczyk

(57) ABSTRACT

The disclosed bladder (10) is useful in ambient temperature fabrication of rubber parts and components. Due to the particular combination of construction materials used, the bladder has excellent release properties and results in improved manufacturing uniformity. At least one portion of the bladder (10) is formed from a lack tack, high abrasion resistant polyurethane. The polyurethane may comprise a ring-shaped portion (26) of the bladder surface or an entire end (20) of the bladder.

10 Claims, 3 Drawing Sheets

TIRE BUILDING BLADDER

FIELD OF THE INVENTION

The present invention relates to improved sleeves or bladders for tire building machines for building tires.

BACKGROUND OF THE INVENTION

In automated tire manufacturing process, the use of rubber bladders for forming tire bead packages and green tires is conventional in the art. The rubber forming the various tire components of the bead package and the green tire are in the uncured or green state In the manufacturing process. The turnup step employing the bladder is typically carried out at ambient temperatures (approximately 0° to 30° C.).

Bladders used in tire manufacturing must be elastomeric, have high elongation at break and must be capable of returning substantially to its original dimensions when stress is removed since it is subjected to repeated inflations and deflations. The bladder must have high durability, good cut resistance, and the outside surface should have good release properties, so as to minimize or eliminate sticking of the uncured rubber tire components to the outside surface of the turnup bladder.

Bladders have been made in accordance with several different methods. One such method of bladder construction is disclosed in U.S. Pat. No. 3,932,255 (Sarascan). Sarascan teaches covering the entire outer surface and a portion of the inner surface of a core of elastomeric material with a spray coating of polyurethane to obtain a desired thickness of the polyurethane layer. Following application of the liquid polyurethane, the sleeve is cured overnight prior to use.

U.S. Pat. No. 5,213,823 (Hunt) discloses that polysiloxane coatings have also been applied to create bladders with good release properties. Hunt teaches forming the bladder of a PVC material to obtain desired cut resistance and release properties.

For the two coated bladders, the manufacture of the bladder can be very time consuming.

The present invention is directed toward an improved bladder for use in tire manufacturing.

Molded and shaped polyurethane parts are dimensionally more accurate than compression molded rubber parts or hand built rubber/fabric parts as manufactured in present bladder manufacturing techniques. This improvement in accuracy can play a critical factor towards building a more uniform tire.

Additionally, many shapes and form are difficult to produce with the present bladders used in current tire manufacturing processes, requiring rubber gum-strips to be laid up on vertical surfaces and in accurate quantities to achieve complex shapes. The molds must be very strong to allow compressing the rubber and sustain the curing temperature. The present invention simplifies this considerably, as the polyurethane is liquid prior to polymerization. Mold costs are also reduced by the present invention.

Prior attempts have been made to incorporate polyurethane parts with building bladders, such as that disclosed by U.S. Pat. No. 4,168,336 (White et al). White et al teaches employing a separate T-shaped molded polyurethane part in combination with a pair of bladders for forming a bead and apex package. While this disclosed method assists in forming the bead package in the manner desired, the use of the molded part requires extra steps, including ensuring proper placement of the molded part, to achieve consistent manufacturing of the bead package.

The primary purpose of this invention is a turn-up bladder with superior dimensional precision in the area of bead clamping on the tire building drum by means of polyurethane parts and at the same time using the reinforced rubber structure in the inflating body of the turn-up bladder.

In the present invention polyurethane parts are bonded to rubber parts, the rubber may or may not be reinforced. In particular, the polyurethane parts used as part of a tire building turn-up bladder assembly together with a rubber inflatable body.

SUMMARY OF THE INVENTION

The present invention provides a bladder, useful in ambient temperature fabrication of rubber parts and components, having excellent release properties and resulting in improved manufacturing uniformity.

The present invention is an improved inflatable bladder for use in making an uncured rubber article on a building machine with which the bladder is associated. The bladder has an inflatable body portion with dimensions suitable for attachment in an operative relationship with a building machine. The bladder is defined by a first outer end and a second outer end relative to the operative relationship of the bladder with the building machine. The improved bladder is comprised of a rubber elastomer and polyurethane bonded to the rubber. The polyurethane portion is located at one of the ends of the bladder.

In one aspect of the present invention, the polyurethane comprising the polyurethane portion of the building bladder exhibits high tear and abrasion resistant properties. The polyurethane comprising the polyurethane portion of the building bladder may also be defined by its Shore A property, with a preferred Shore A hardness within the range of 25–85.

In one embodiment of the improved bladder, the polyurethane portion is ring shaped. The ring shaped portion is bonded in a recess of the rubber elastomer of the building bladder.

In a further aspect of the first embodiment of the improved bladder, the polyurethane portion has a width of 10 to 20% of the width of the bladder when the bladder is uninflated and mounted on the building machine.

In another aspect of the first embodiment, the second outer end of the bladder may also be provided with a similar ring-shaped polyurethane portion.

In a second embodiment of the improved bladder, the entire first outer end of the bladder may be formed from the polyurethane.

A further aspect of the second embodiment, the entire first outer end of the polyurethane portion of the building bladder has a width of 20 to 50% of the width of the bladder when the bladder is uninflated and mounted on the building machine.

BRIEF DESCRIPTION OF THE DRAWINGS

The invention will be described by way of example and with reference to the accompanying drawings in which.

DETAILED DESCRIPTION OF THE PREFERRED EMBODIMENTS

Building bladders, as noted above, are useful in several phases of tire production, and in many different types of building machines. Therefore, the exact overall bladder configurations illustrated within the context of describing the present invention are to be considered illustrative of the inventive concept and not limiting to any particular disclosed bladder configuration.

Figure 1:
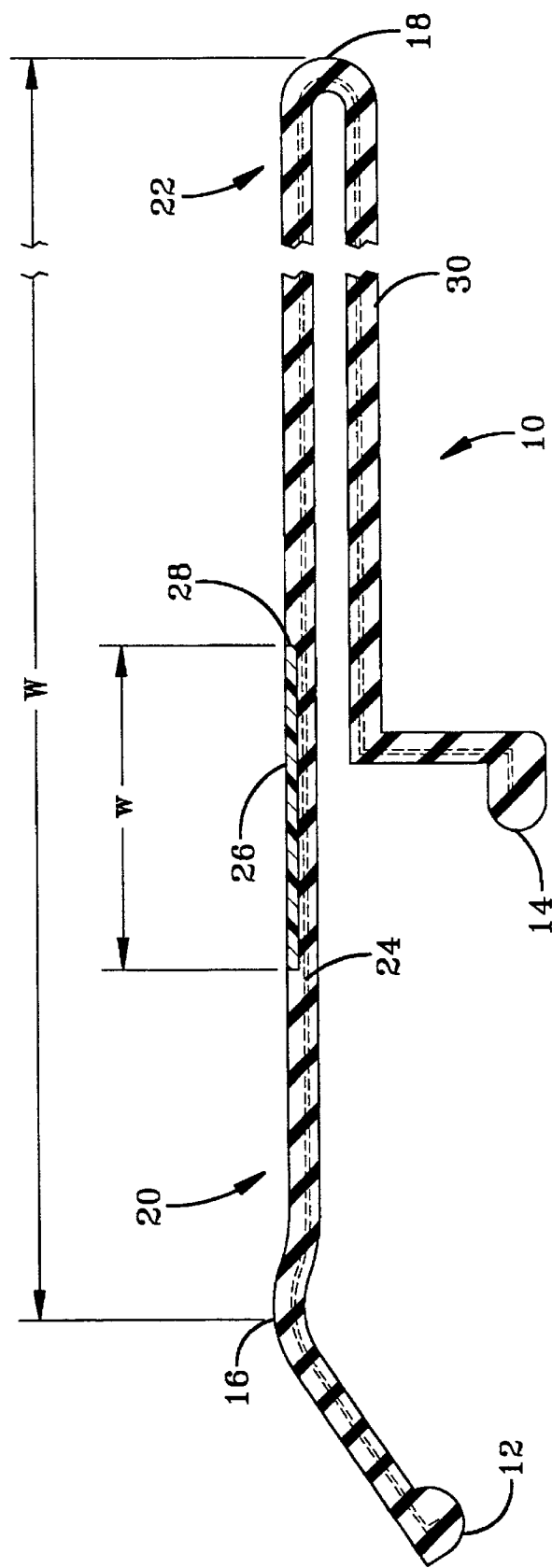
FIG. 1 is a cross-sectional view of one embodiment of the present invention.

FIG. 1 illustrates a building bladder incorporating a first embodiment of the present invention. The bladder 10 has a substantially toroidal shape, and opposing bladder bead areas 12, 14 for connection with the machine upon which the bladder 10 is to be mounted. Since building machines can be constructed in a variety of known configurations, the machine upon which the bladder is to be mounted is not illustrated herein. The configuration of the bladder beads 12, 14 may vary to suit the actual machine upon which the bladder is to be mounted. The bladder 10 has an overall dimensional width, W, as defined by the unexpanded configuration of the bladder. The width, W, extends from the radially outermost endpoints 16, 18 of the unexpanded bladder 10, as mounted on the machine. The bladder 10, when in this unexpanded configuration, may be defined by a first outer end 20 and a second outer end 22.

The primary construction material of the bladder 10 is rubber elastomer. The rubber portion 30 may be reinforced in any conventional manner, from a single reinforcing ply to the illustrated multiple reinforcing plies 24, or more than the illustrated two plies. The reinforcing plies 24 are similar to plies used in tire formation, in that each ply is an elastomeric layer containing reinforcing cords. The cords may be of any conventional material, such as polyester, cotton, nylon, aramid, metallic fibers such as steel, or any combination of known conventional materials.

At a location spaced from the endpoint 16 of the first outer end 20 of the bladder 10, a polyurethane ring 26 is bonded into a recess 28 in the bladder 10. The recess 28 has a depth corresponding to the thickness of the polyurethane ring 26 so that the surface of the polyurethane ring 26 is flush with the surface of the rubber bladder 10.

The ring 26 is preferably spaced 5 to 25% from the edge of the first outer endpoint 16 of the bladder 10, and has a width w of 10 to 25% of the bladder width W. The placement of the recess 28, and the corresponding polyurethane ring 26, is selected to optimize the uniformity of the article formed upon the bladder 10 and corresponding building machine (not illustrated).

The embodiment illustrated in FIG. 1 is ideal for bead building machines and the location of the polyurethane ring 26 is selected to correspond with the placement location of the tire bead ring upon the bladder 10. For use of this embodiment with tire building machines, the polyurethane ring 26 is placed at a location where the uncured plies which are laid upon the building bladder 10 are turned back upon themselves or other plies, so that the uncured material will fold over without causing wrinkling due to the low tack characteristics of the polyurethane.

Polyurethanes can be easily formulated to give very accurate hardness and flexibility properties. The composition of the elastomeric rubber portion 30 of the bladder 10, however, in order to maintain their strength and working properties in the turn-up bladder, cannot be varied too much. The combination of the polyurethane and rubber allows for an added dimension of freedom to produce a bladder with optimal properties for article, and especially tire, manufacturing.

The polyurethane employed for the present invention is of a low-tack, high abrasion resistant formulation. The use of such a polyurethane provides a substantially improved release of the formed article from the bladder 10 and the associated building machine. These properties aid in the maintaining of good dimensional stability and uniformity over the life of the bladders. The polyurethane has a Shore A hardness in the range of 25 to 85, with a preferred Shore A hardness of 55 to 70. The polyurethane may also be defined by a tensile strength in the range of 30–45 MN/m$^2$ and an elongation percentage of at least 475 to at most 650. These characteristics are determined in accordance with the proper ASTM and BS standards. Examples of types of polyurethanes which may be used include, but are not limited to, polyetherpolyurethanes, polyestherpolyurethanes, and thermosetting polyurethanes.

The ring 26 may be formed by several different methods. The ring 26 may be cast molded in the final desired configuration, it may be sheet molded and then cut, or it may be sheet molded, cut and then calendered into the final desired width and thickness to form the ring 26.

The bond between the polyurethane portion 26 of the bladder and the rubber portion 30 of the bladder 10 must be such to enable a long bladder life. The bond must be sufficiently strong between the rubber and the low-tack polyurethane. Bonding can be achieved by the use of commercially available bonding agents. The particular bonding agent employed will be dependent upon the type and characteristics of both the rubber and the polyurethane being bonded together. One known commercially available bonding agent is CILBOND.

If the building machine the bladder 10 is to be mounted upon permits construction of the article at either end 20, 22 of the bladder 10, the second end 22 may also be provided with a polyurethane ring 26 similar to the ring 26 located in the first outer end 20.

Figure 2:
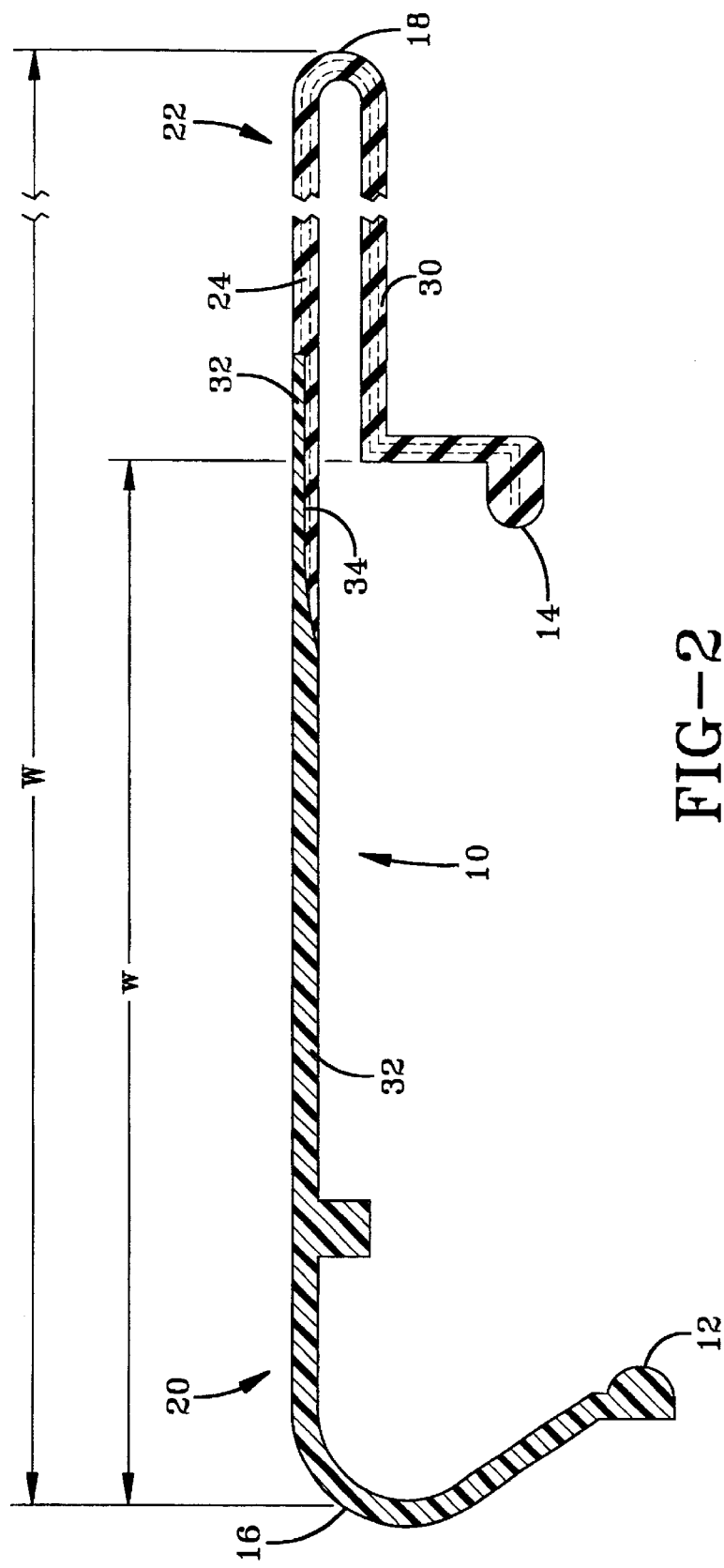
FIG. 2 is a cross-sectional view of a second embodiment of the invention.

FIG. 2 illustrates a second embodiment of a building bladder 10 in accordance with the invention. As all of the embodiments of the present invention are directed toward a building bladder, when possible, identical identifying numerals are used in the different embodiments. As noted above, the overall dimensions of the building bladder 10, and the bladder beads 12, 14 are dependent upon the building machine upon which the bladder 10 is to be used. The illustrated bladder 10 has the entire first end 20 formed of polyurethane. By forming the entire outer end 20 of the bladder 10 from the polyurethane 32, the builder need not be concerned about the exact placement of any material upon the bladder during manufacturing to ensure proper placement of the material on the polyurethane portion 32.

The polyurethane portion 32 of the bladder has a width w which is approximately 20% to 50% of the overall effective width W of the unexpanded bladder 10. The radially inner point of the polyurethane portion 32 is determined by the splice 34 between the polyurethane portion 32, and the rubber portion 30. Illustrated in FIG. 2 is a lap splice 34. The approximate midpoint of the lap splice determines the width w of the polyurethane portion 32. The splice 34 between the polyurethane portion 32 and the rubber portion 30 is preferably located at the same radial location as the second bead 14 of the bladder 10. Thus the actual, preferred width w of the polyurethane portion 32 is determined by the size of the bladder 10, the bladder configuration, and the building machine. However, to maintain durability of the bladder 10, the width w of the polyurethane portion 32 does not exceed 50% of the overall width W of the bladder 10.

The splice 34 may be of any type of conventional lap splice. Butt splices may be used in forming the bladder 10, however, the lap splice provides the greatest amount of surface area to achieve a better splice between the two dissimilar materials.

Figure 3:
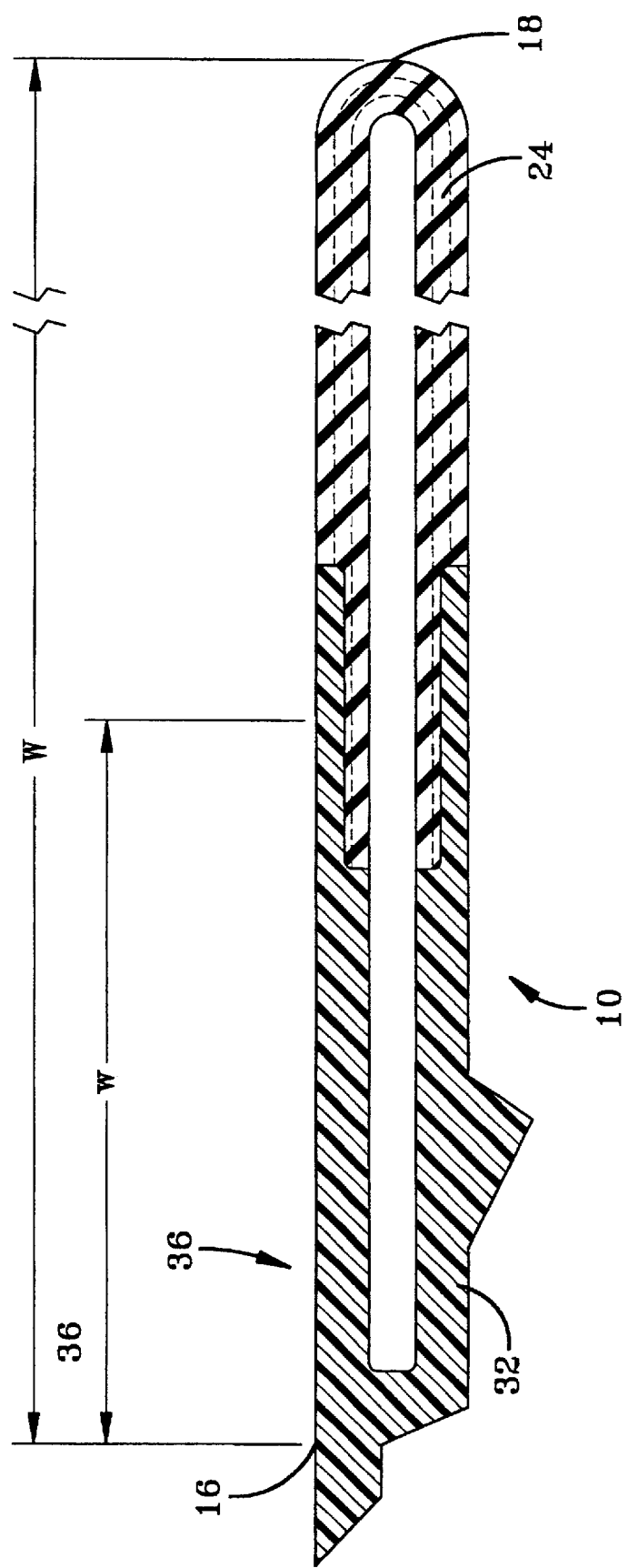
FIG. 3 is a cross-sectional view of a third embodiment.

FIG. 3 illustrates a third building bladder embodiment. Herein, the bladder 10 is defined by a fully closed toroidal configuration. The first end portion 36 of the bladder 10 is formed of polyurethane. The width W of the bladder 10 is, again, defined between the radially outermost endpoints 16, 18 when the bladder 10 is in an uninflated state. The width w of the polyurethane portion 32 is approximately 25% to 50% of the width W of the bladder 10.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved inflatable bladder (10) for use in making an uncured rubber tire on a tire building machine with which the bladder (10) is associated, wherein the bladder (10) is adapted to fit on a tire building machine, the bladder (10) including an inflatable body portion having dimensions suitable to attach the bladder in an operative relationship with the tire building machine, the bladder (10) having a first outer end (20), a second outer end (22), and an outer surface, the ends and outer surface being relative to the operative relationship of the bladder (10) with the tire building machine, the improvement being characterized by:

the bladder (10) being comprised of a rubber elastomer portion (30) and a polyurethane portion (26, 32) bonded to the rubber elastomer portion, an outermost portion of the rubber elastomer portion comprises part of the outer surface of the bladder (10), the polyurethane portion (26, 32) is bonded to the rubber elastomer portion and an outermost surface of the polyurethane portion also comprises part of and is flush with the outer surface of the bladder.

2. An improved bladder (10) in accordance with claim 1 wherein the polyurethane portion (26) is bonded in a recess (28) of the rubber elastomer (30).

3. An improved bladder (10) in accordance with claim 2 wherein the polyurethane portion (26) has a width (w) of 10 to 20% of the width (W) of the bladder (10) when the bladder (10) is uninflated and mounted on the building machine.

4. An improved bladder (10) in accordance with claim 1 wherein the bladder (10) comprises two polyurethane portions (26, 32).

5. An improved bladder (10) in accordance with claim 1 wherein the entire first outer end of the bladder (10) is polyurethane (32) and void of rubber elastomer.

6. An improved bladder (10) in accordance with claim 5 wherein the polyurethane portion (32) has a width (w) of 20 to 50% of the width (W) of the bladder (10) when the bladder (10) is uninflated and mounted on the building machine.

7. An improved bladder (10) in accordance with claim 1 wherein the polyurethane (26, 32) has a Shore A hardness within the range of 25–85.

8. An improved bladder (10) in accordance with claim 1 wherein the polyurethane portion (26, 32) is molded to the desired shape of the portion (26, 32) prior to being bonded to the elastomer (30) of the bladder (10).

9. A method of forming an inflatable bladder (10) for use in making an uncured tire article on a bead or tire building machine with which the bladder (10) is associated, the bladder including an inflatable body portion having dimensions suitable for attachment in an operative relationship with the bead or tire building machine, the bladder (10) having a first outer end (20) and a second outer end (22) relative to the operative relationship of the bladder (10) with the bead or tire building machine, and the bladder having an outer and inner surface, the method comprising the steps of:

forming a bladder (10) from elastomer, the bladder comprising a first outer end and a second outer end, an outer and an inner surface, and means to attach the bladder to a bead or tire building machine, forming a recess on the outer surface of the bladder, the recess being spaced from one end (20, 22) of the bladder (10), bonding a premolded polyurethane portion (26) in the recess (28), an outermost surface of the bonded polyurethane portion being flush with the outer surface of the bladder.

10. A turn-up bladder (10) wherein the bladder is adapted to fit a tire or tire bead building machine, the bladder comprising an inflatable body portion having dimensions to attach the bladder in an operative relationship with the tire or tire bead building machine, the bladder (10) having a first outer end (20), a second outer end (22), and an outer surface relative to the operative relationship of the bladder (10) with the tire or tire bead building machine, the improvement being characterized by:

the bladder (10) being comprised of a rubber elastomer portion (30), an outermost surface of the rubber elastomer portion (30) comprising part of the outer surface of the bladder (10), and a polyurethane portion (26, 32) bonded to the rubber elastomer portion (30), the polyurethane portion having an outermost surface, wherein the outermost surface of the bonded polyurethane portion is flush with the outer surface of the bladder and comprises part of the outer surface of the bladder.

* * * * *